//  FIP8102    OR    3,786,355

United States

Midkiff

[11] 3,786,355
[51] Jan. 15, 1974

[54] RADIO FREQUENCY RESISTANCE DISCRIMINATOR HAVING DEAD ZONE OUTPUT CHARACTERISTIC

[75] Inventor: James C. Midkiff, Cincinnati, Ohio

[73] Assignee: Cincinnati Electronics Corporation, Evendale, Ohio

[22] Filed: Dec. 28, 1971

[21] Appl. No.: 212,915

[52] U.S. Cl. .................................. 325/174, 333/17
[51] Int. Cl. ........................................... H04b 1/04
[58] Field of Search .......... 325/171–177; 333/17, 32

[56] References Cited
UNITED STATES PATENTS

| | | | |
|---|---|---|---|
| 3,496,493 | 2/1970 | Nielsen | 325/174 |
| 2,981,902 | 4/1961 | Familier | 325/174 |
| 3,117,279 | 1/1964 | Ludvigson et al. | 325/174 |

*Primary Examiner*—Albert J. Mayer
*Attorney*—Charles M. Hogan

[57] ABSTRACT

Herein disclosed is an improved loading discriminator for sensing the resistive component of impedance at the input of an antenna coupler. This discriminator provides a first error signal derived through conventional current and voltage sampling techniques. It also provides a second error signal. These error signals are applied to differential amplifier stages in such a way that the resultant control signal has a negative portion derived from the second error signal and a positive portion derived from the first error signal, said portions being separated by a dead zone.

6 Claims, 5 Drawing Figures

INVENTOR.
JAMES C. MIDKIFF
BY Charles M. Hogan
ATTORNEY.

INVENTOR.
JAMES C. MIDKIFF

BY Charles M. Hogan

ATTORNEY

RADIO FREQUENCY RESISTANCE DISCRIMINATOR HAVING DEAD ZONE OUTPUT CHARACTERISTIC

BACKGROUND OF THE INVENTION

This invention pertains to improved loading discriminator circuitry for measuring the real part of the complex impedance seen at the input to an antenna coupler. The output of the resistance sensor (i.e., loading discriminator) circuitry is used to automatically tune the antenna. With the new and improved resistance sensor herein provided, maximum power is transferred from a final radio frequency stage to an antenna. This condition remains in effect for all frequencies of operation and for all antenna impedances encountered.

Sensing of the real portion of the complex impedance is accomplished by utilizing the error signals from the phase resistance sensing circuits, in a servo loop, to adjust the variable elements in the coupler in such manner that the antenna impedance is transformed to the optimum load impedance required by the power amplifier. The error signal is such that tune-up of the antenna coupler is indicated by having a zero voltage null achieved at the output of the resistance measuring circuit.

BRIEF DESCRIPTION OF THE DRAWINGS

For a better understanding of the invention, together with other objects, advantages and capabilities thereof, reference is made to the following description of the accompanying drawings in which:

FIG. 5 is a curve showing the servo drive signal produced by the improved sensor.

OBJECTS OF THE INVENTION

Figure 1:
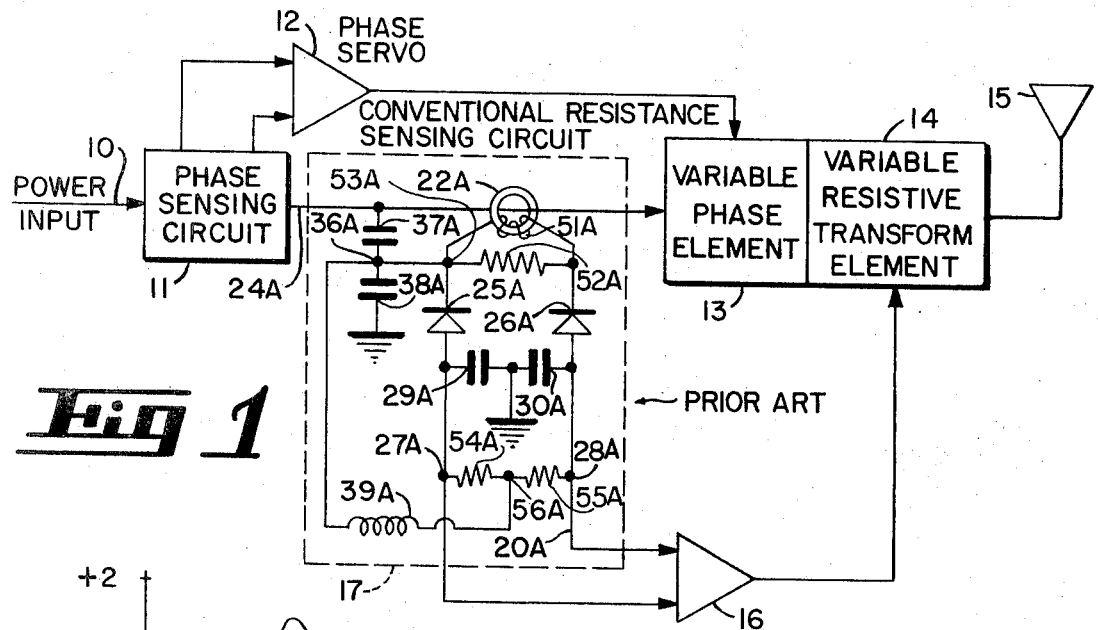
FIG. 1 is a circuit schematic of a conventional antenna coupler network, generally in block form, including a prior art loading discriminator.

Making reference first to the prior art system of FIG. 1, the line 10 represents the output of the final radio frequency amplifying stage of a transmitter-receiver and this stage (not shown) is coupled by the other elements shown in FIG. 1 to an antenna 15 in such a way that impedance match between amplifier output and antenna is automatically maintained, over a wide range of frequencies. These objectives are achieved by the use of sensing and correcting devices. A phase sensing circuit 11 senses the existence of any lead or lag between the voltage of line 10 and the current therein. When the current is leading, then the load looks like a capacitive reactance to the amplifier stage. When the current is lagging, then the load looks like an inductive reactance to that stage. The function of the phase sensing circuit is therefore to determine the direction and deviation of phase difference from the desired in-phase condition which exists when the amplifier is matched to the antenna and there are no reflections. The phasing discriminator furnishes an output error signal which controls a phase servo device 12 which in turn drives a variable phase element 13 in one direction or another in order to maintain or restore the desired in-phase condition. The loading discriminator is disposed within the dashed outline 17.

The function of the loading discriminator is to sense any deviation of the desired ratio between line voltage and line current (multiplied by the cosine of the phase angle) from that predetermined ratio that exists when the final radio frequency stage looks into the desired impedance. When the output of the amplifier is properly matched to the antenna and tuned, then the amplifier stage looks into a purely resistive impedance of say 50 ohms. Any deviation from this is applied to a resistance servo device 16 which drives a variable resistance transforming element in one direction or another so as to maintain the desired 50 ohm resistive load, for example.

The circuit elements shown in the dashed outline box 17 comprise a toroidal core 22a through which is threaded signal carrying line 24a that forms a primary winding of a transformer. A secondary winding 51a of the transformer is a multi-turn winding on the toroidal core 22a. Shunting winding 51a is resistor 52a across which is developed a voltage that is a replica of current flowing through line 24a.

To provide a sample of the voltage standing wave ratio (VSWR) on line 24a, capacitors 37a and 38a are connected between line 24a and ground. Capacitors 37a and 38a form a voltage divider having a tap 36a which is connected to terminal 53a between one end of winding 51a and one end of resistor 52a. To derive a d.c. signal indicative of the amplitude and phase difference of the voltages developed at tap 36a and across resistor 52a, and therefore indicative of the amplitude and phase difference of the voltage and current samples, a rectifying network is provided. The rectifying network includes diodes 25a and 26a, having cathodes connected to opposite ends of winding 51a. Anodes of diodes 25a and 26a are connected through shunt capacitors 29a and 30a to ground. The anodes of diodes 25a and 26a are also connected to resistors 54a and 55a, having a common terminal 56a that is connected to one end of series inductor 39a, the other end of which is connected to tap 36a. In response to the instantaneous difference in the r.f. voltage developed at tap 36a and across resistor 52a, there is developed a d.c. potential difference between terminals 27a and 28a. The d.c. voltage between terminals 27a and 28a is therefore indicative of the difference in the amplitude and phase of the voltage and current samples. The difference voltage developed across terminals 27a and 28a is detected by differential amplifier 16, which derives a d.c. output voltage that controls the resistance of variable resistive transform element 14. It will be understood that elements in FIG. 1 bearing the suffix A correspond to like numbered elements in FIG. 3, without such suffix.

Figure 3:
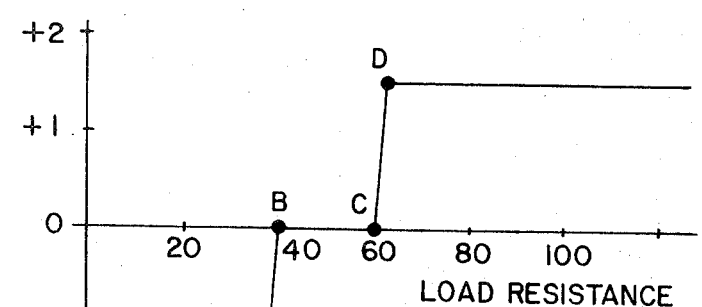
FIG. 3 is a circuit diagram of a preferred form of improved loading discriminator in accordance with the invention, that loading discriminator being particularly useful in the FIG. 1 environment.
Figure 3:
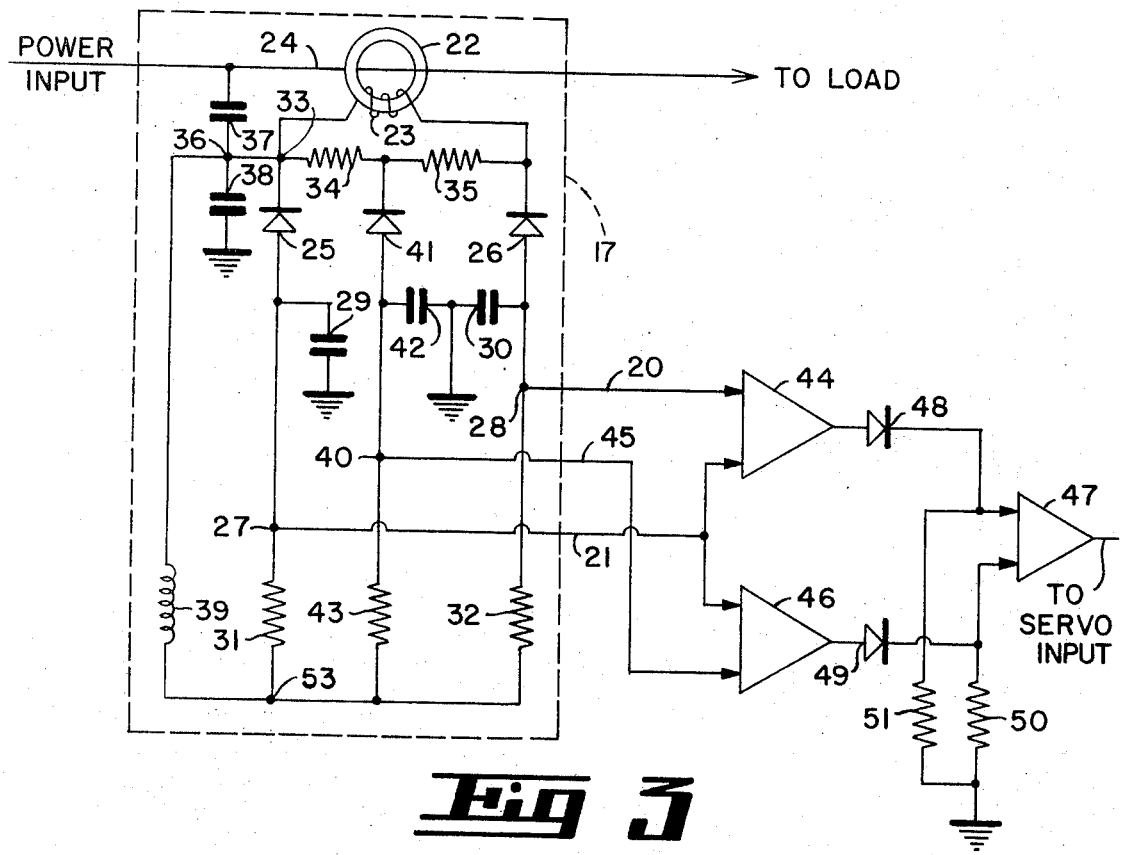

The improvements that can be obtained by us of this invention can be shown by comparing a typical system that uses a conventional sensing circuit of FIG. 1 with a similar system using the improved circuit of FIG. 3.

A block diagram of a typical prior art circuit is shown in FIG. 1. The purpose of the system is to ensure maximum power transfer, from the power amplifier to the antenna, at all frequencies of operation and antenna impedance.

This is accomplished by utilizing the error signals from the phase and resistance sensing circuits 12 and 17, in servo loops, to adjust the variable elements 13 and 14 in the coupler such that the antenna impedance is transformed to the optimum load impedance required by the final radio frequency power amplifier stage.

Figure 2:
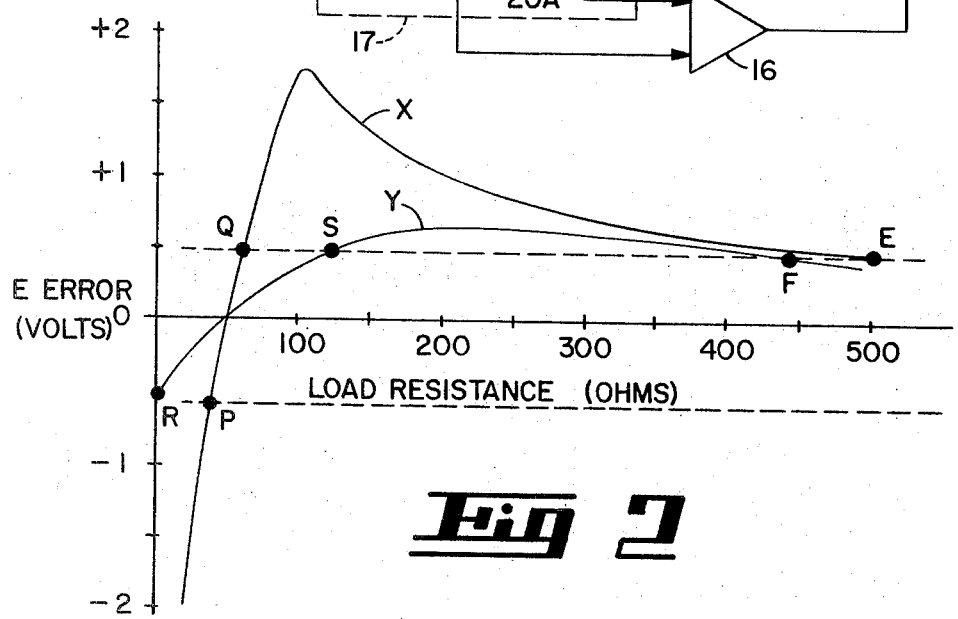
FIG. 2 is a set of characteristic curves relating to the prior art loading discriminator of FIG. 1.

The error voltage from a 50 ohm resistance sensing circuit is plotted in FIG. 2. Curve X shows how the error voltage varies as the load resistance is increased from zero to 500 ohms. Curve Y shows the effect of adding a 150 ohm series reactance to the load. The dotted lines indicate an error threshold zone which is necessary for stability of the system. When the error signal exceeds the positive or negative threshold level the servo will operate to tune the coupler in the direction required to reduce the error.

Some limitations of this prior art system are shown in the graphs of FIG. 2 and are as follows:

1. The resistive sensing range is limited. The intersection of Curve X, with the positive threshold level at point E, shows that the error signal will not be great enough to operate the system when the load resistance is greater than 500 ohms. The intersection of Curve Y, at point F, shows that the sensing range decreases with a reactive load.

2. The tuning accuracy is degraded by load reactance. This is due to the change in sensitivity and is shown by the intersection of Curves X and Y with the threshold levels. Curve X crosses the threshold zone at points P and Q, which correspond to resistive load values of 40 and 60 ohms, and the system will tune to some value within this range.

Curve Y crosses the threshold zone at points R and S, corresponding to zero and 120 ohms, which would allow the system to stop tuning at any value within this range.

3. The threshold zone is critical. If it is made too high then the system will not recognize high resistance errors. If it is made too low the system will overshoot and hunt.

4. The radio frequency power level is critical. Increasing the power would increase the error signal level which would produce an effect similar to reducing the threshold zone.

The improved resistance sensing circuit, shown n FIG. 3, overcomes these limitations. This circuit has two error signal outputs shown plotted in the graph of FIG. 4.

It is therefore an object of the present invention to provide an improved loading discriminator system in which the threshold zone is less dependent on voltage level and which will operate in the presence of high load resistance.

DETAILED DESCRIPTION OF THE INVENTION

A first error signal appears between the lines 20 and 21. For this purpose, the FIG. 3 embodiment comprises a magnetic core or toroid 22 on which is wound a secondary 23. This secondary is inductively coupled by the core to the input line 24, serving as a primary. The end leads of the secondary 23 are connected to the cathodes of rectifier diodes 25 and 26, respectively, the anodes of which are connected to the end terminals 27 and 28, respectively, of a load network. This load network comprises capacitor 29, between terminal 27 and ground, and capacitor 30, between terminal 28 and ground. The network further comprises resistances 31 and 32 connected in series between terminals 27 and 28 and having a junction at 53. Connected across secondary 23 is a series combination of resistors 34 and 35.

D. C. voltages indicative of the difference in the amplitude and phase of the voltage sample and all of the current sample are developed with diodes 25 and 25, capacitors 29 and 30, capacitors 37 and 38 and inductor 39 in substantially the same manner as described supra concerning FIG. 1. The voltage sample at tap 36 is supplied to the junction of capacitor 29 and the anode of diode 25 and to the junction of capacitor 30 and the anode of diode 26 via low pass filtering series inductor 39 and resistors 31 and 32 which are respectively connected to capacitors 29 and 30. At a tap between resistors 34 and 35 a further voltage is derived indicative of a fraction of the current sample. The instantaneous amplitude of the further voltage and the voltage sample at tap 36 is derived by providing diode 41 and a filter circuit comprising shunt capacitor 42 and series resistor 43 that is connected to a common junction of inductor 39 and resistors 31 and 32. Diode 41 is poled in the same direction as diodes 25 and 26, whereby there is developed a d.c. voltage, at common terminal 40 for the anode of diode 41 and capacitor 42, indicative of the phase and amplitude difference of the voltage sample and the fractional current sample. A signal indicative of the difference of the entire current sample and the voltage sample is derived by connecting input terminals of differential amplifier 44 to terminals 27 and 28 at the anodes of diodes 25 and 26. To provide an indication of the voltage difference of the fraction of the current sample and the voltage sample, as indicated by the voltage difference between terminals 27 and 40, these two terminals are connected to input terminals of differential amplifier 46. To provide a three-level output, as described infra, d.c. output signals of amplifiers 44 and 46 are supplied through rectifiers 48 and 49 to load resistors 51 and 50, respectively. The voltage difference between resistors 50 and 51 is detected by d.c. differential amplifier 47, which derives an output signal having only one of three levels.

A sample of the current flowing in line 24 between the r.f. source and load appears as a signal voltage across the opposite end terminals of a resistive voltage divider comprising resistors 34 and 35. A voltage sample is introduced into the terminal 33 of the sensing circuit from point 36 on a capacitance divider comprising a series arrangement of capacitor 37 and capacitor 38 in shunt between line 24 and ground standing wave ratio (VSWR) betwee line 24 and ground. Capacitor 37 couples line 24 to the sensing circuit. The first error voltage appearing between lines 20 and 21 is a function of the phase displacement between the voltage sample at 33 and the current sample in the resistive network 34, 35 as well as the magnitude of the voltage and current samples.

Because of the improvements provided by the invention an additional error signal appears between terminals 40 and 27. The additional error signal is responsive to a predetermined fraction of the current sample, as derived from a signal voltage across resistor 34, i.e., between one end terminal and a tap of the resistive voltage divider. Current sampling resistor 34 is connected at its ends to the cathodes of diodes 41 and 25, the anodes of which are connected to a load network comprising capacitors 42 and 29 and resistors 43 and 31, respectively. Again, from point 36 there is introduced a voltage sample at point 33, the junction of resistor 34 and the capacitors 37 and 38. Therefore there appears between terminals 27 and 40 a second error signal dependent on the phase relationship between the voltage sample at 33 and the current sample in the resistor 34 as well as the magnitude of the voltage sample and current sample in resistor 34.

In order to provide a suitable drive signal having a negative portion AB, a dead zone BC, and a positive portion CD (FIG. 5), the output comprising lines 20 and 21 is connected to differential amplifier 44 which responds to the positive portions of the first error signal on lines 20, 21 to produce the positive output CD. The output lines 21 and 45 are connected to a differential amplifier 46 which responds to the negative portions of the second error signal (on lines 21 and 45) to produce a positive output on amplifier 46 and a negative output AB on differential amplifier 47. Because of the diodes 48 and 49, interconnecting amplifiers 44 and 46, respectively, with differential amplifier 47, the amplifier 47 accepts only positive inputs. Note the load resistors 50 and 51 between the input terminals of differential amplifier 47 and ground.

The output signal from amplifier 47, which at any time essentially has only one of three levels, is shown in FIG. 5, this output signal being plotted as ordinates against load resistance as abscissae. The slope of the curve from points A to B and C to D is determined by the gain of the amplifiers 44, 46 and 47 and is limited only by their stability. Therefore the threshold zone of the system is determined by the zero crossing points of the curve shown in FIG. 4 rather than by an absolute voltage level.

Figure 4:
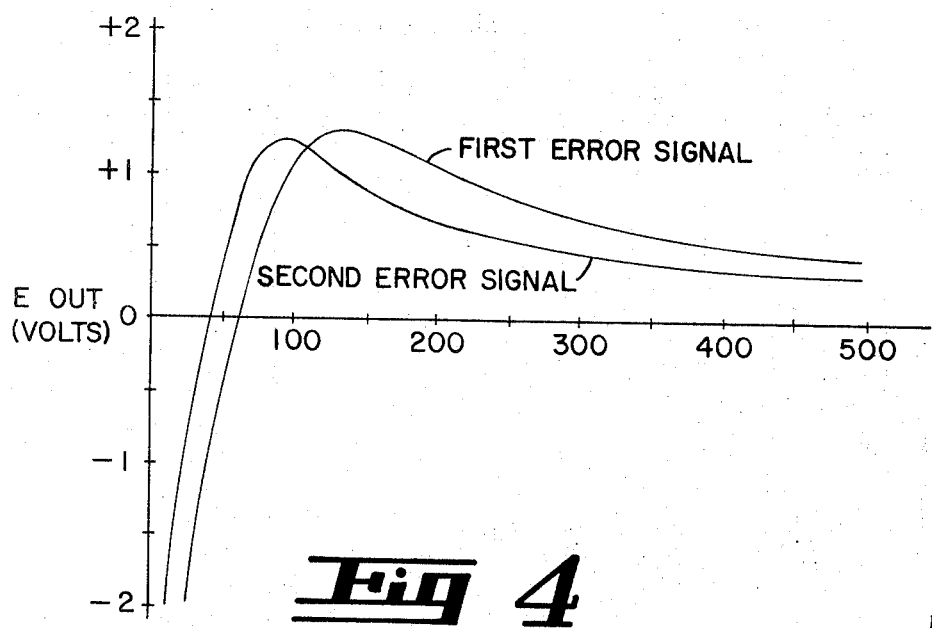
FIG. 4 is a set of curves descriptive of error signals generated by the discriminator of FIG. 3.

The zero crossing points shown in FIG. 4 will be determined by the circuit parameters of the voltage and current sampling network. In the circuit reduced to practice the values of coil 23 and resistors 34 and 35 were chosen such that the magnitude of voltage drop across them had a predetermined relationship to the magnitude of the junction 36. This relationship provided the following results. When the parameters of the load were such that the VSWR was 1.2 to 1.0 and the real component of resistance was 60 ohms, the voltage drop across the combination of resistors 34 and 35 was exactly twice the magnitude of the voltage sample appearing at junction 36. Further, the phase relation of the two samples were in direct opposition. Secondly, for the load condition such that the VSWR was 1.2 to 1.0 but with the real component of the load being below 50 ohms (near 40 ohms), the voltage drop across resistor 34 alone was then twice the reference voltage sample present at junction 36. This criteria makes the voltage drop across resistor 32 equal that across resistor 31 when the real component of the transmitter load is 60 ohms. Second, for the case where the real component of the transmitter load equals 40 ohms, the voltage drop across resistor 43 exactly equals that across resistor 31. This is graphically shown in FIG. 4 at the points where the first and second error signals respectively cross the zero $E_{out}$ line at impedance values of 60 and 40 ohms respectively. When both error voltages are negative and positive the output voltages of amplifier 47 are respectively negative and positive as illustrated in FIG. 4 to the left of point A and to the right of point D. In response to the impedance being in the desired region, between 40 and 60 ohms, the output of amplifier 47 is zero, as shown by FIG. 4 between points B and C.

It will of course be understood that the improved resistance sensing circuit of FIG. 3 can be substituted for the contents of block 17 in FIG. 1 in order to achieve an over-all improved antenna coupler.

This patent application and invention are the property of Avco Corporation, subject to an irrevocable, nonexclusive and royalty free license, in favor of the Government of the United States of America, to practice and have practiced the invention throughout the world, for Government purposes, in accordance with the provisions of contract No. DAAB-07-C-0263.

While there has been shown and described what is understood to be the preferred embodiment of the invention it will be apparent to those skilled in the art that various modifications and changes may be made therein without departing from the invention as defined by the claims hereto appended. For example, the two error signals can equally as well be obtained by the use of a network which provides two voltage and one current sample in lieu of the two current and one voltage samples which are provided by the FIG. 3 implementation.

Having fully described my invention, I claim:

1. A loading discriminator of the type adapted to be coupled between a source of radio frequency power and a load, in order to detect resistive deviations from a desired condition of match, said loading discriminator comprising:
   a resistive voltage divider having an intermediate terminal and first and second input terminals,
   means coupled to the source of radio frequency power for providing a current sample across said voltage divider,
   a common terminal,
   first, second and third rectifying networks individually connected between said common terminal and the three terminals of said voltage divider, the three rectifier networks comprising, respectively, a first rectifier and a first resistor in series, a second rectifier and a second resistor in series, and a third rectifier and a third resistor in series,
   said rectifiers being poled alike and having individual output terminals,
   first, second and third capacitors individually connected between a point of reference potential and said rectifier output terminals, each capacitor constituting, together with its associated resistor and rectifier, a peak detector network,
   means coupled to said source for applying an a.c. voltage sample to the rectifier networks so that the third rectifier network rectifies that voltage sample as a reference and further so that the first rectifier network rectifies the sum of that sample and the entire current sample and the second rectifier network rectifies the sum of said voltage sample and a portion of said current sample, whereby a first error signal appears between the outputs of the first and third detector networks and a second error signal appears between the outputs of the second and third detector networks, a high impedance for alternating currents coupled between said common terminal and said resistive voltage divider, and
   differential amplifier means having inputs coupled to the outputs of said detector network and having outputs coupled to said load, said amplifier means being responsive to that portion of one of said error signals which is of positive polarity and to that portion of the other error signal which is of negative polarity so as to produce a resultant output having a dead zone relatively independent of radio frequency power levels.

2. A loading discriminator in accordance with claim 1 in which the means for providing a current sample comprises a magnetic core coupled to the source and a coil wound on said core and connected to said resistive voltage divider, and further in which the means for applying a voltage sample to the rectifier networks comprises a capacitive divider.

3. A discriminator for detecting resistive variations presented by an r.f. load to a source of r.f. energy connected to the load, said variations having a desired condition in a range between first and second resistance values, comprising means responsive to current flowing between the source and load for deriving first and second signals that are replicas of the current, the magnitude of said first signal being a predetermined fraction of the magnitude of the second signal, means responsive to the VSWR between leads connecting the source and load for deriving a third signal that is a replica of the voltage between the leads, first means for comparing the first and third signals for deriving a first error signal having a zero level in response to the first resistance being presented by the load to the source, second means for comparing the second and third signals for deriving a second error voltage having a zero level in response to the second resistance being presented by the load to the source, and means responsive to said error signals for deriving an output signal having three levels, a first of said levels being responsive to both said error signals indicating that the presented resistance is less than both said first and second resistances, a second level being responsive to both said error signals indicating that the presented resistance is between said first and second resistances, a third level being responsive to both said error signals indicating that the presented resistance is greater than both said first and second resistances.

4. The discriminator of claim 3 wherein the means for deriving the first and second signals includes a transformer having a single turn primary comprising a lead connecting the source and load, said transformer having a secondary winding, a voltage divider connected across said secondary winding, said divider having a tap, whereby the first signal is derived between one end terminal of the divider and the tap and the second signal is derived between opposite end terminals of the divider.

5. The discriminator of claim 4 wherein the means for deriving the third signal includes a capacitive voltage divider connected between the terminals and having a tap connected to said one end terminal so that said capacitive voltage divider tap and said one end terminal are at substantially the same potential, said first and second means for comparing including: first, second and third rectifiers having like electrodes respectively connected to said one end terminal, the tap on the divider connected across the secondary winding and the other end terminal, and low pass filter means connected to the other electrode of each rectifier, said filter means including a separate shunt capacitor connected to the other electrode of each rectifier and inductance means in series circuit between the tap of the capacitive voltage divider and the other electrode of each rectifier, whereby the first error voltage is developed between the other electrodes of the first and second rectifiers and the second error voltage is developed between the other electrodes of the second and third rectifiers.

6. A discriminator for detecting resistive variations presented by an r.f. load to a source of r.f. energy connected to the load, said variations having a desired condition in a range between first and second resistance values, comprising means responsive to current flowing between the source and load for deriving first and second signals that are replicas of the current, the magnitude of said first signal being a predetermined fraction of the magnitude of the second signal, means responsive to the VSWR between leads connecting the source and load for deriving a third signal that is a replica of the voltage between the leads, first means for comparing the first and third signals for deriving a first error signal having a zero level in response to the first resistance being presented by the load to the source, second means for comparing the second and third signals for deriving a second error voltage having a zero level in response to the second resistance being presented by the load to the source, and means responsive to said error signals for deriving an output signal having two limit values between which an intermediate level is derived, one of said limit values being derived in response to both said error signals indicating that the presented resistance is less than both said first and second resistances, the other limit value being derived in response to both said error signals indicating that the presented resistance is greater than both the first and second resistances, the intermediate value being derived in response to both said error signals indicating that the presented resistance is between the first and second resistances.

* * * * *